United States Patent
Bellesis et al.

(10) Patent No.: US 6,940,681 B2
(45) Date of Patent: Sep. 6, 2005

(54) OPTICAL TO MAGNETIC ALIGNMENT IN MAGNETIC TAPE SYSTEM

(75) Inventors: George Bellesis, Jefferson, MA (US); Leo Guglielmo, Ormond Beach, FL (US); Tzuochang Lee, Shrewsbury, MA (US); Robert Johnson, Acton, MA (US); James Fitzpatrick, Sudbury, MA (US)

(73) Assignee: Quantum Corporation, San Jose, CA (US)

(*) Notice: Subject to any disclaimer, the term of this patent is extended or adjusted under 35 U.S.C. 154(b) by 366 days.

(21) Appl. No.: 09/933,920

(22) Filed: Aug. 20, 2001

(65) Prior Publication Data

US 2003/0035238 A1 Feb. 20, 2003

(51) Int. Cl.[7] ................................................ G11B 5/584
(52) U.S. Cl. .......................... 360/77.12; 360/77.03; 360/78.02
(58) Field of Search ............................ 360/77.12, 78.02, 360/77.03, 78.11, 75, 74.06, 121, 25, 131, 134, 77.13; 369/14, 44.11, 44.14, 44.17

(56) References Cited

U.S. PATENT DOCUMENTS

| | | | |
|---|---|---|---|
| 2,923,781 A | 2/1960 | Gordon et al. | |
| 3,404,392 A | 10/1968 | Sordello | |
| 3,426,337 A | 2/1969 | Black et al. | |
| 3,637,991 A | 1/1972 | Yanagawa | |
| 3,662,120 A | 5/1972 | Hess | |
| 3,768,752 A | 10/1973 | Bettini et al. | |
| 3,790,755 A | 2/1974 | Silverman | |
| 3,838,291 A | 9/1974 | Marion et al. | |
| 3,914,793 A | 10/1975 | Burnham | |
| 3,916,039 A | 10/1975 | Akashi et al. | |
| 3,980,480 A | 9/1976 | Lairidon et al. | |
| 4,008,085 A | 2/1977 | Lemahieu et al. | |
| 4,123,788 A | 10/1978 | Kruger | |
| 4,176,381 A | 11/1979 | de Niet et al. | |
| 4,275,425 A | 6/1981 | Watanabe et al. | |
| 4,313,143 A | 1/1982 | Zarr | |
| 4,315,283 A | 2/1982 | Kinjo et al. | |
| 4,340,305 A | 7/1982 | Smith et al. | |
| 4,371,904 A | 2/1983 | Brooke | |
| 4,380,032 A | 4/1983 | Pfost | |
| 4,424,111 A | 1/1984 | Moeller et al. | |
| 4,558,383 A | 12/1985 | Johnson | |
| 4,570,191 A | 2/1986 | Di Stefano et al. | |
| 4,578,311 A | 3/1986 | Ishikuro et al. | |
| 4,626,469 A | 12/1986 | Yamaguchi et al. | |

(Continued)

FOREIGN PATENT DOCUMENTS

| | | |
|---|---|---|
| CH | 586 944 | 4/1977 |
| DE | 24 06 292 | 8/1975 |
| DE | 26 16 362 | 11/1977 |
| DE | 32 01 935 | 8/1983 |
| DE | 34 17 426 | 11/1985 |

(Continued)

*Primary Examiner*—David Hudspeth
*Assistant Examiner*—Jason Olson
(74) *Attorney, Agent, or Firm*—Morrison & Foerster LLP

(57) ABSTRACT

A method of positioning a selected recording channel on a recording head relative to an optical servo system includes positioning the optical servo system at a first position relative to the selected recording, processing an alignment tape to determine a lateral offset between the optical servo system and the selected recording channel and positioning the optical servo system at a second position relative to the selected recording channel using the lateral offset. An alignment tape is also provided, which includes an elongated continuous web of flexible plastic substrate material having two edges and defining a front major surface and a back major surface, a magnetic storage medium formed on the front major surface, an inert medium formed on the back major surface and a track of alignment voids for indicating actual lateral displacement of the selected recording channel relative to the optical servo system.

29 Claims, 7 Drawing Sheets

U.S. PATENT DOCUMENTS

| | | |
|---|---|---|
| 4,633,451 A | 12/1986 | Ahn et al. |
| 4,679,104 A | 7/1987 | Dahlerud |
| 4,737,877 A | 4/1988 | Krongelb et al. |
| 4,746,542 A | 5/1988 | Chino et al. |
| 4,750,067 A | 6/1988 | Gerfast |
| 4,759,991 A | 7/1988 | Kanno et al. |
| 4,775,969 A | 10/1988 | Osterlund |
| 4,802,030 A | 1/1989 | Henry et al. |
| 4,816,939 A | 3/1989 | Ford et al. |
| 4,816,941 A | 3/1989 | Edel et al. |
| 4,843,494 A | 6/1989 | Cronin et al. |
| 4,848,698 A | 7/1989 | Newell et al. |
| 4,868,046 A | 9/1989 | Moriizumi et al. |
| 4,876,886 A | 10/1989 | Bible et al. |
| 4,884,260 A | 11/1989 | Bouldin et al. |
| 4,935,835 A | 6/1990 | Godwin et al. |
| 4,937,810 A | 6/1990 | Drexler et al. |
| 4,958,245 A | 9/1990 | Roth et al. |
| 4,961,123 A | 10/1990 | Williams et al. |
| 4,969,058 A | 11/1990 | Williams et al. |
| 4,983,496 A | 1/1991 | Newell et al. |
| 5,008,765 A | 4/1991 | Youngquist |
| 5,016,240 A | 5/1991 | Strandjord et al. |
| 5,038,030 A | 8/1991 | Hayashi et al. |
| 5,050,017 A | 9/1991 | Carr et al. |
| 5,065,387 A | 11/1991 | Roth et al. |
| 5,067,039 A | 11/1991 | Godwin et al. |
| 5,080,479 A | 1/1992 | Rosenberg |
| 5,105,322 A | 4/1992 | Steltzer |
| 5,120,927 A | 6/1992 | Williams et al. |
| 5,121,371 A | 6/1992 | Farnsworth et al. |
| 5,122,727 A | 6/1992 | Janssen et al. |
| 5,163,032 A | 11/1992 | Van Nieuwland et al. |
| 5,196,297 A | 3/1993 | Dombrowski et al. |
| 5,196,969 A | 3/1993 | Iwamatsu et al. |
| 5,210,672 A | 5/1993 | Ivers et al. |
| 5,229,620 A | 7/1993 | Pahr |
| 5,262,908 A | 11/1993 | Iwamatsu et al. |
| 5,279,775 A | 1/1994 | Thomas et al. |
| 5,280,402 A | 1/1994 | Anderson et al. |
| 5,283,773 A | 2/1994 | Thomas et al. |
| 5,311,378 A | 5/1994 | Williams et al. |
| 5,319,507 A | 6/1994 | Umebayashi et al. |
| 5,322,987 A | 6/1994 | Thomas et al. |
| 5,333,091 A | 7/1994 | Iggulden et al. |
| 5,349,484 A | 9/1994 | Koehler |
| 5,363,255 A | 11/1994 | Ivers et al. |
| 5,369,631 A | 11/1994 | Hwang |
| 5,371,636 A | 12/1994 | Nayak et al. |
| 5,379,170 A | 1/1995 | Schwarz |
| 5,379,283 A | 1/1995 | Miyajima |
| 5,382,463 A | 1/1995 | Adkins et al. |
| 5,414,578 A | 5/1995 | Lian et al. |
| 5,414,585 A | 5/1995 | Saliba |
| 5,432,652 A | 7/1995 | Comeaux et al. |
| 5,448,430 A | 9/1995 | Bailey et al. |
| 5,450,257 A | 9/1995 | Tran et al. |
| 5,452,152 A | 9/1995 | Rudi |
| 5,457,586 A | 10/1995 | Solhjell |
| 5,462,823 A | 10/1995 | Evans et al. |
| 5,475,673 A | 12/1995 | Adkins |
| 5,510,140 A | 4/1996 | Kurose et al. |
| 5,515,212 A | 5/1996 | Chiao et al. |
| 5,518,804 A | 5/1996 | Mizuno et al. |
| 5,523,904 A | 6/1996 | Saliba |
| 5,532,042 A | 7/1996 | Kawarai et al. |
| 5,535,069 A | 7/1996 | Chiao et al. |
| 5,535,190 A | 7/1996 | Moore et al. |
| 5,563,868 A | 10/1996 | Farnsworth et al. |
| 5,566,033 A | 10/1996 | Frame et al. |
| 5,579,717 A | 12/1996 | Crandell et al. |
| 5,589,247 A | 12/1996 | Wallack et al. |
| 5,615,205 A | 3/1997 | Belser |
| 5,655,475 A | 8/1997 | Crandell et al. |
| 5,661,616 A | 8/1997 | Tran et al. |
| 5,661,823 A | 8/1997 | Yamaguchi et al. |
| 5,674,583 A | 10/1997 | Nakayama et al. |
| 5,675,448 A | 10/1997 | Molstad et al. |
| 5,677,806 A | 10/1997 | Eckberg et al. |
| 5,680,278 A | 10/1997 | Sawtell, Jr. |
| 5,689,384 A | 11/1997 | Albrecht et al. |
| 5,705,268 A | 1/1998 | Ishikawa et al. |
| 5,718,964 A | 2/1998 | Naoe et al. |
| 5,726,834 A | 3/1998 | Eckberg et al. |
| 5,774,313 A | 6/1998 | Tanaka et al. |
| 5,855,589 A | 1/1999 | McEwen et al. |
| 5,858,589 A | 1/1999 | Govaert et al. |
| 5,872,675 A | 2/1999 | Solhjell |
| 5,877,910 A | 3/1999 | Williams et al. |
| 5,906,867 A | 5/1999 | Kaige et al. |
| 5,914,151 A | 6/1999 | Usuki |
| 5,928,761 A | 7/1999 | Hedblom et al. |
| 5,993,948 A | 11/1999 | Yamazaki et al. |
| 6,018,434 A | 1/2000 | Saliba |
| 6,033,752 A | 3/2000 | Suzuki et al. |
| 6,063,489 A | 5/2000 | Kobayashi et al. |
| 6,075,678 A | 6/2000 | Saliba |
| 6,084,740 A | 7/2000 | Leonhardt et al. |
| 6,103,365 A | 8/2000 | Ishii et al. |
| 6,108,159 A | 8/2000 | Nute et al. |
| 6,162,532 A | 12/2000 | Black et al. |
| 6,236,529 B1 | 5/2001 | Leonhardt et al. |
| 6,246,535 B1 | 6/2001 | Saliba et al. |
| 6,275,349 B1 | 8/2001 | Smith |
| 6,284,361 B1 | 9/2001 | Kobayashi et al. |
| 6,319,595 B1 | 11/2001 | Katashima et al. |
| 6,365,061 B1 | 4/2002 | Damer et al. |
| 6,433,951 B1 * | 8/2002 | Lubratt ............... 360/77.12 |
| 6,493,174 B1 | 12/2002 | Stubbs |
| 6,558,774 B1 * | 5/2003 | Saliba et al. ............ 428/156 |
| 6,563,662 B2 | 5/2003 | Smith |
| 6,768,608 B2 | 7/2004 | Saliba et al. |
| 2001/0006437 A1 | 7/2001 | Leonhardt et al. |
| 2002/0021524 A1 * | 2/2002 | Saliba et al. ............ 360/77.12 |
| 2003/0043498 A1 * | 3/2003 | Johnson et al. ......... 360/77.12 |
| 2003/0086199 A1 * | 5/2003 | Basra et al. ............ 360/77.12 |

FOREIGN PATENT DOCUMENTS

| | | |
|---|---|---|
| DE | 41 42 052 | 7/1992 |
| EP | 0 069 548 | 1/1983 |
| EP | 0 083 753 | 7/1983 |
| EP | 0 097 774 | 1/1984 |
| EP | 0 108 258 | 5/1984 |
| EP | 0 119 568 | 9/1984 |
| EP | 0 130 495 | 1/1985 |
| EP | 0 155 000 | 9/1985 |
| EP | 0 166 199 | 1/1986 |
| EP | 0 177 737 | 4/1986 |
| EP | 0 180 258 | 5/1986 |
| EP | 0 189 948 | 8/1986 |
| EP | 0 244 005 | 11/1987 |
| EP | 0 257 713 | 3/1988 |
| EP | 0 311 485 | 4/1989 |
| EP | 0 311 859 | 4/1989 |
| EP | 0 336 419 | 10/1989 |
| EP | 0 344 759 | 12/1989 |
| EP | 0 347 074 | 12/1989 |
| EP | 0 351 837 | 1/1990 |
| EP | 0 353 007 | 1/1990 |
| EP | 0 368 268 | 5/1990 |
| EP | 0 368 269 | 5/1990 |

| | | | | | | |
|---|---|---|---|---|---|---|
| EP | 0 390 555 | 10/1990 | | JP | 6-139549 | 5/1994 |
| EP | 0 423 662 | 4/1991 | | JP | 6-243619 | 9/1994 |
| EP | 0 434 230 | 6/1991 | | JP | 6-259736 | 9/1994 |
| EP | 0 443 810 | 8/1991 | | JP | 7-029136 | 1/1995 |
| EP | 0 535 112 | 12/1991 | | JP | 7-057412 | 3/1995 |
| EP | 0 484 774 | 5/1992 | | JP | 7-065434 | 3/1995 |
| EP | 0 484 775 | 5/1992 | | JP | 7-220255 | 8/1995 |
| EP | 0 484 779 | 5/1992 | | JP | 7-082626 | 9/1995 |
| EP | 0 484 780 | 5/1992 | | JP | 8-174669 | 7/1996 |
| EP | 0 496 461 | 7/1992 | | JP | 9-007131 | 1/1997 |
| EP | 0 549 845 | 7/1993 | | JP | 9-033773 | 2/1997 |
| EP | 0 549 854 | 7/1993 | | JP | 9-035246 | 2/1997 |
| EP | 0 555 511 | 8/1993 | | JP | 9-265626 | 10/1997 |
| EP | 0 564 187 | 10/1993 | | JP | 9-289885 | 11/1997 |
| EP | 0 645 043 | 12/1993 | | JP | 9-289973 | 11/1997 |
| EP | 0 645 044 | 12/1993 | | JP | 9-297914 | 11/1997 |
| EP | 0 655 960 | 12/1993 | | JP | 9-320197 | 12/1997 |
| EP | 0 598 503 | 5/1994 | | JP | 10-043924 | 2/1998 |
| EP | 0 606 710 | 7/1994 | | JP | 10-190867 | 7/1998 |
| EP | 0 684 597 | 11/1995 | | JP | 10-251432 | 9/1998 |
| EP | 0 854 471 | 7/1998 | | JP | 10-297181 | 11/1998 |
| EP | 1 026 665 | 8/2000 | | JP | 11-066529 | 3/1999 |
| EP | 1 026 666 | 8/2000 | | JP | 11-066745 | 3/1999 |
| EP | 1 026 667 | 8/2000 | | JP | 11-096705 | 4/1999 |
| EP | 1 117 092 | 7/2001 | | JP | 11-126328 | 5/1999 |
| FR | 2 315 142 | 1/1977 | | JP | 4-305844 | 6/1999 |
| GB | 2 008 290 | 5/1979 | | JP | 11-154312 | 6/1999 |
| GB | 1 595 136 | 8/1981 | | JP | 11-161928 | 6/1999 |
| GB | 2 121 227 | 12/1983 | | JP | 11-213383 | 8/1999 |
| GB | 2 335 785 | 9/1999 | | JP | 11-213384 | 8/1999 |
| JP | 56-111169 | 9/1981 | | JP | 11-242814 | 9/1999 |
| JP | 57-050346 | 3/1982 | | JP | 11-339254 | 12/1999 |
| JP | 57-120230 | 7/1982 | | JP | 11-353642 | 12/1999 |
| JP | 57-120255 | 7/1982 | | JP | 2001-048351 | 2/2001 |
| JP | 61-142530 | 6/1986 | | JP | 2001-067652 | 3/2001 |
| JP | 61-293372 | 12/1986 | | JP | 2001-076326 | 3/2001 |
| JP | 62-192025 | 8/1987 | | KR | 9406847 | 7/1994 |
| JP | 63-148416 | 6/1988 | | SU | 1137513 | 1/1985 |
| JP | 63-251924 | 10/1988 | | WO | WO 83/01858 | 5/1983 |
| JP | 64-070916 | 3/1989 | | WO | WO 85/02933 | 7/1985 |
| JP | 2-169915 | 6/1990 | | WO | WO 85/03376 | 8/1985 |
| JP | 3-094881 | 4/1991 | | WO | WO 88/02168 | 3/1988 |
| JP | 3-141087 | 6/1991 | | WO | WO 94/12975 | 6/1994 |
| JP | 3-201215 | 9/1991 | | WO | WO 99/21178 | 4/1999 |
| JP | 3-219432 | 9/1991 | | WO | WO 99/21179 | 4/1999 |
| JP | 3-242816 | 10/1991 | | WO | WO 99/27530 | 6/1999 |
| JP | 4-003832 | 1/1992 | | WO | WO 99/28909 | 6/1999 |
| JP | 4-038632 | 2/1992 | | WO | WO 00/49604 | 8/2000 |
| JP | 4-059399 | 2/1992 | | WO | WO 00/49605 | 8/2000 |
| JP | 4-252417 | 9/1992 | | WO | WO 00/49607 | 8/2000 |
| JP | 5-073883 | 3/1993 | | | | |
| JP | 6-020414 | 1/1994 | | * cited by examiner | | |

OPTICAL TO MAGNETIC ALIGNMENT IN MAGNETIC TAPE SYSTEM

TECHNICAL FIELD

This invention relates to optical to magnetic alignment in a magnetic tape recording system, and more particularly to a magnetic tape recording system utilizing a laser-guided magnetic recording (LGMR) optical servo system.

BACKGROUND

To increase data storage and retrieval performance, many digital linear magnetic tape recording systems utilize multi-head, multi-channel fixed head structures with narrowed recording gaps and track widths so that many linear data tracks may be achieved on a tape medium of predetermined width. Reliable verification of data is implemented using heads capable of "read while write." Tape substrates are also being made thinner with increased tape lengths in small diameter packages.

Head positioning optical servo systems are employed to position a read and/or write head in a magnetic tape system over a selected track of data; these systems are generally referred to as laser-guided magnetic recording (LGMR) systems. Misalignment between the read/write head and the data track may cause data errors during read back and data loss on adjacent tracks during writing.

To ensure a working head positioning optical servo system (including read while write) and also magnetic tape cartridge interchange capability the optical servo system should be aligned with the magnetic read/write head during its manufacture and prior to shipment to an end-user.

SUMMARY

In a general aspect, the invention features a method of positioning a selected recording channel on a recording head relative to an optical servo system in a read/write assembly including positioning the optical servo system at a first position relative to the selected recording channel in the read/write assembly, processing an alignment tape in the read/write assembly to determine a lateral offset between the optical servo system and the selected recording channel, and positioning the optical servo system at a second position relative to the selected recording channel using the lateral offset.

In a preferred embodiment, the alignment tape includes a track of longitudinal equally spaced apart alignment voids. Processing includes writing a track of data to the alignment tape over the track of alignment voids, imaging a section of the alignment tape to determine a lateral distance between a center of the track of alignment voids and a center of the track of data, and setting the lateral offset to the lateral distance. Imaging includes placing the section of alignment tape under a Magnetic Force microscope or placing the section of alignment tape under an optical microscope using ferrofluid. The lateral distance is measured in micrometers ($\mu$m). The second position is laterally upward from the first position if the lateral offset is a negative number and laterally downward from the first position if the lateral offset is a positive number. Imaging may further include determining an average lateral distance between several alignment voids and the track of data, and setting the lateral offset to the average lateral distance.

Alternatively, processing includes writing and subsequently reading a track of data to a front major surface of the alignment tape on the track of alignment voids with a write head and a read head of the selected recording channel, monitoring a bit-error ratio (BER) from reading the track of data, and correlating the bit-error ratio (BER) to the lateral offset. Correlating includes relating a maximum BER to the lateral offset. A negative lateral offset value indicates the optical servo system is laterally above the selected recording channel and a positive lateral offset indicates the optical servo system is laterally below the selected recording channel. The BER represents a number of erroneous data bits read divided by the total number of data bits written.

Alternatively, processing includes providing a plurality of longitudinally arranged equally spaced apart alignment void tracks on the alignment tape, moving the recording head across the tracks in a motion perpendicular to a motion of the alignment tape, writing and reading a magnetic signal to the alignment tape by the selected recording channel at a higher frequency than the frequency of alignment voids moving past the selected recording channel to determine an amplitude demodulated magnetic signal, directing a beam of light by the optical servo system to the alignment tape to determine an optical signal, and determining a timing difference between the envelope of the demodulated magnetic signal and the envelope of the optical signal. Determining may include the timing difference between a peak in the envelope of the demodulated magnetic signal and a peak in the envelope of the optical signal. Determining may include calibrating the timing difference using the velocity measured from the timing difference between peaks in the envelope of the optical signal. Determining may include the cross-correlation function to find the timing difference between the envelope of the demodulated magnetic signal and the envelope of the optical signal. The velocity is determined from the separation of peaks in the cross-correlation function. The lateral offset is set equal to the timing difference divided by the velocity.

Alternatively, processing includes providing a plurality of longitudinally arranged equally spaced apart alignment void tracks on the alignment tape, moving the recording head across the tracks in a motion perpendicular to a motion of the alignment tape, directing multiple beams of light by the optical servo system to the alignment tape to determine a number of optical signals, and determining a timing difference between the envelope of one optical signal and the envelope of another optical signal. The optics are rotated to bring the timing difference divided by the velocity to a desired value. Determining may include the cross-correlation function to find the timing difference between the envelope of one optical signal and the envelope of another optical signal.

The alignment tape includes longitudinal tracks on a second major surface of the tape, and recording channel positioning alignment voids. Processing includes suspending the alignment tape in a coupon, positioning the alignment tape with the coupon over a recording channel pair to position a line from one element of a channel pair to another, and positioning the optical servo system such that one generated optical spot is centered on a middle one of the longitudinal tracks and other generated optical spots are offset by a desired amount. Passing the tape through a laser system generates the tracks. Positioning includes viewing the alignment tape under a microscope, and adjusting the alignment tape's position with a precision translation and rotation stage attached to the coupon.

In another aspect, the invention features an alignment tape for positioning a selected recording channel of a recording head relative to an optical servo system in a read/write assembly including an elongated continuous web of flexible plastic substrate material having two edges and defining a front major surface and a back major surface, a magnetic storage medium formed on the front major surface, an inert medium formed on the back major surface, and a track of alignment voids for indicating actual lateral displacement of the selected recording channel relative to the optical servo system.

In a preferred embodiment, the track of alignment voids is formed by ablation by a pulsating laser beam of sufficient power to penetrate the back major surface through to the front major surface leaving visible the flexible plastic substrate of the alignment tape.

In another aspect, the invention features a method of positioning a selected recording channel on a recording head relative to an optical servo system including fixedly positioning the optical servo system at a position relative to the selected recording channel, processing an alignment tape to determine a lateral offset between the optical servo system and the selected recording channel and storing the lateral offset.

In a preferred embodiment, the method further includes aligning a data track with the selected recording channel using optical servo system and the stored lateral offset during tape travel across the selected recording channel.

Embodiments of the invention may have one or more of the following advantages.

A check of optical alignment both before and after tape drive assembly may be implemented and can be made without disassembly of a completed tape drive. Optical alignment is done rapidly in a manufacturing environment and insures tape interchange between diverse tape drive assemblies by closely aligning the optical servo system to a recording channel, and by providing a measure of residual misalignment, enabling compensation techniques to be implemented.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
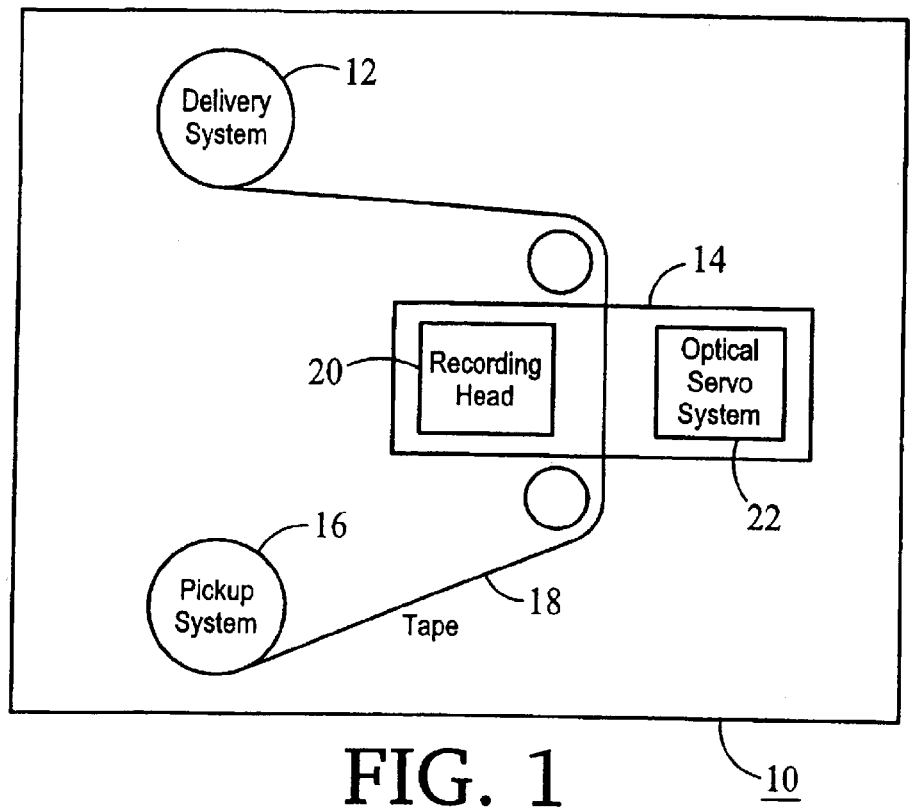
FIG. 1 is a block diagram of an exemplary magnetic tape recording system.

Referring to FIG. 1, an exemplary magnetic tape recording system 10 includes a delivery system 12, a read/write assembly 14 and a pickup system 16. The delivery system 12 houses a magnetic tape 18. The magnetic tape 18 travels past a recording head 20 and an optical servo system 22 contained in the read/write assembly 14 and is delivered to the reel pickup system 16. The recording head 20 reads and writes information, generally referred to as data, onto one or more data tracks on the magnetic tape 18 as it travels from the delivery system 12 to the pickup system 16. As the magnetic tape 18 passes over the recording head 20 the magnetic tape 18 may become misaligned with respect to the intended track position due to, for example, lateral tape motion (LTM). Changes in lateral tape position can be detected by the optical servo system 22 in conjunction with optical servo tracks located on the tape 18 and compensated for via a closed servo control loop, described below.

Figure 2:
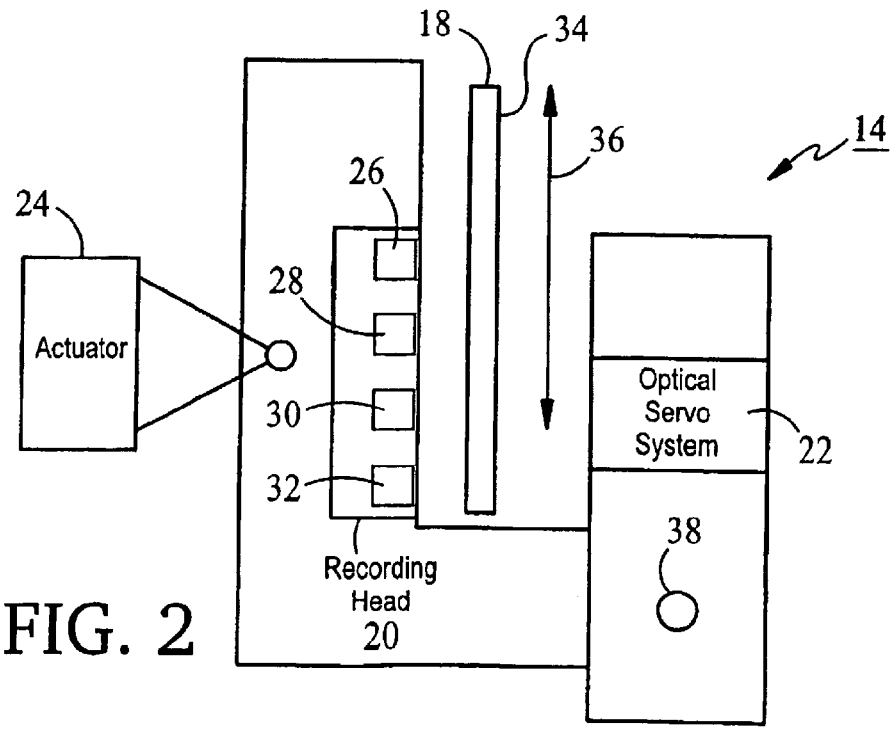
FIG. 2 is a schematic diagram of a cross section of the read/write assembly of FIG. 1.

Referring to FIG. 2, the read/write assembly 14 includes the recording head 20 and the optical servo system 22. An actuator 24 is shown connected to the read/write assembly 14. In operation, the magnetic tape 18 moves across the recording head 20 and a set of data tracks (not shown) are written or read from the tape 18. In one example, the read/write assembly 14 includes a series of recording channels 26, 28, 30 and 32 residing on the recording head 20, thus writing four tracks simultaneously on the tape 18. Four read heads about 0.1 inches downstream (not shown) immediately read and verify the data just written. The optical servo system 22 utilizes one or more optical servo tracks on a second major surface 34 of the magnetic tape 18 to detect lateral tape motion (LTM) of the magnetic tape 18 along an axis 36. Compensation of LTM is done by positioning the read/write assembly 14 relative to the tape 18 via movement of the actuator 24. Specifically, the optical servo system 22 directs a beam of light upon a particular one of the optical servo tracks located on the second major surface 34 of the tape 18. Reflections of the beam of light from the optical servo track result in electronically discernible LTM position error signals. The resultant position error signals are sent to an optical feedback control loop that generates a bi-directional head position correction sending current to a coil motor that results in a servo bias torque. The bias torque is applied to the actuator 24 to pivot the read/write assembly 14 along the axis 36 relative to the tape 18 and thereby follow the tape 18 despite the presence of LTM.

As indicated above, LTM is an undesirable motion of the tape 18 in a lateral direction along the axis 36 that is transverse to the tape direction. LTM may be caused by many factors including tape slitting variations, tension variations, imperfections in the guiding mechanism, friction variations in the recording head 20, and environmental factors such as heat and humidity. These factors affect LTM in various ways. Some cause abrupt momentary jumps along the axis 36 while others may cause a slower variation of tape position along the axis 36. Generally, LTM is unpredictable and unrepeatable and is compensated for by using the optical servo system 22.

During manufacture of the read/write assembly 14, the optical servo system 22 is aligned to one of the recording channels 26, 28, 30, 32, recording channel 30 for example, using a special alignment tape. The alignment tape provides an offset between the optical servo system 22 and the recording channel 30 that is used to align or position the two before the read/write assembly 14 is shipped to customers. During the manufacture of the read/write assembly 14, the recording head 20, and more specifically, one of the recording channels 26, 28, 30, 32, is aligned with the optics contained in the optical servo system 22. Without this alignment of a recording channel and the optics, interchange of tapes during operation may be affected. Specifically, if an offset between a recording channel and the optics of the optical servo system in a first read/write assembly is large in one direction along the axis 36, and an offset between a recording channel and the optics of the optical servo system in a second read/write assembly is large in an opposite direction along the axis 36, read/write errors will occur when the first read/write assembly writes data to a tape and the second read/write assembly attempts to read the data from the tape. This results because the overall offset of the data from the recording channel will be so great so as to prevent the read/write assembly from moving along the axis 36 to compensate for the offset and thus be aligned properly to the data so that the data can be read. This is referred to as tape interchangeability. The ability of the reading drive to compensate for overall offset introduced on a tape by the writing drive is limited by the finite number of optical servo tracks on major surface 34 of the tape 18. This limit, caused by the fact that the optical servo system 22 must remain within sight of the optical servo tracks, also limits the ability of a writing drive to compensate for its own known offset. Thus, utilizing the offset gained from using the alignment tape during the manufacture of the read/write assembly 14, an adjuster 38 can manually move and lock into position the optical servo system 22 relative to the magnetic reading head 20, minimizing the offsets that must be compensated while in service. The adjuster 38 moves the optical servo system 22 in a direction parallel to the axis 36. It is worth noting that after final movement of the adjuster 38, any remaining offset can be measured and stored in the tape system 10. The tape system 10 could then compensate for this stored offset during writing of data by moving the recording head 20 according to the stored offset to ensure that data tracks are written without such a residual offset.

Figure 3:
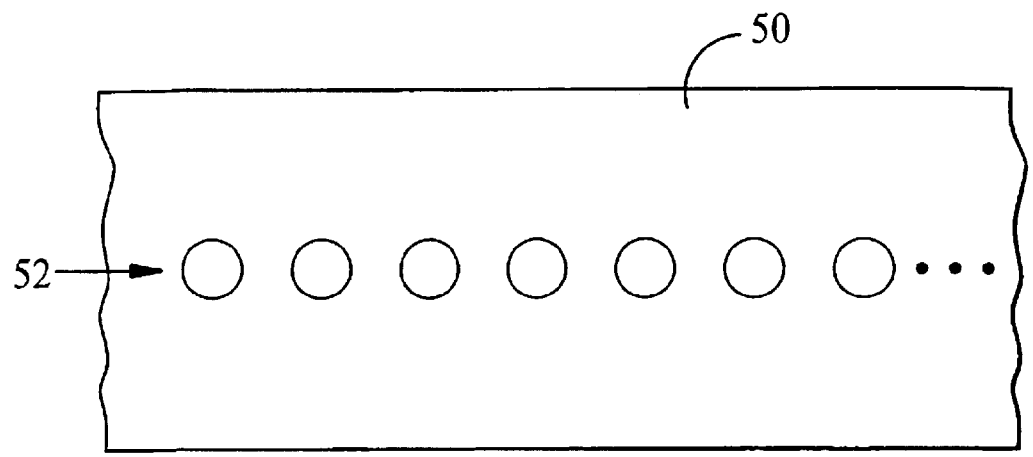
FIG. 3 is a schematic diagram of an exemplary alignment tape.

Referring to FIG. 3, an alignment tape 50 includes a track of special marks referred as alignment voids 52. The term void as used herein refers to a location of the alignment tape 50 in which the magnetic material on a first major surface of the alignment tape 50 is absent and in which the generally inert backing material on a second, opposite, major surface of the alignment tape 50 is absent, leaving only an area of exposed base film. Specifically the alignment voids 52 are a series of longitudinally arranged, equally spaced, spots of exposed base film. In operation, the track of alignment voids 52 is utilized during manufacturing of the read/write assembly 14 to align, as mentioned above, the optical servo system 22 with one of the recording channels 26, 28, 30 or 32.

Figure 4:
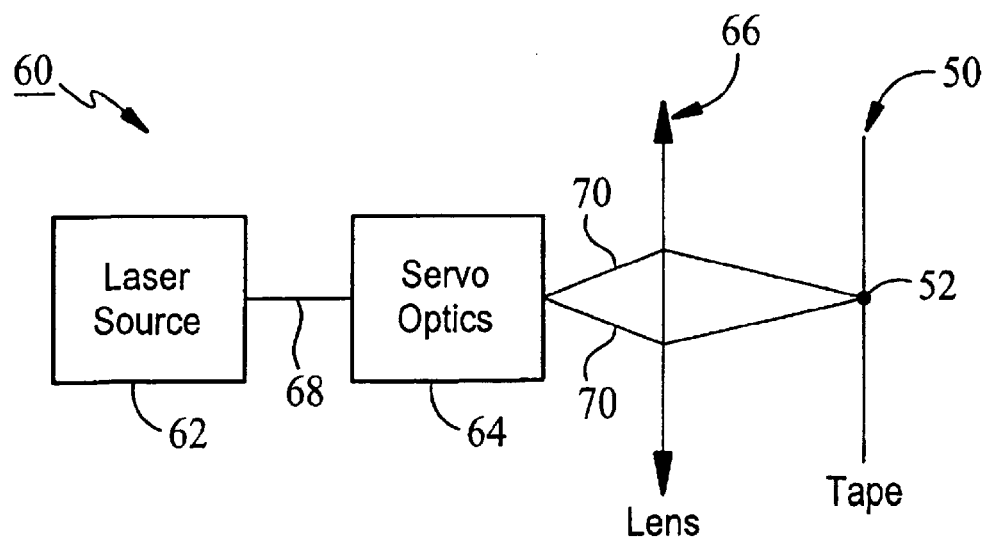
FIG. 4 is a block diagram of an exemplary optical servo writer system.

Referring to FIG. 4, an exemplary laser system 60 for producing a track of alignment voids 52 includes a laser source 62, a servo writer optics system 64 and a lens 66. The laser source 62 generates a beam of collimated light 68. In a preferred embodiment, the light 68 is in the ultraviolet (UV) range of the spectrum. The collimated light 68 enters the optics system 64 where it generates a focused beam 70. The focused beam 70 is passed through the lens 66 and directed on to the alignment tape 50. Upon hitting the alignment tape 50, the focused beam 70 removes pieces of inert backing material from the second major surface of the alignment tape 50 and magnetic material from the first major surface of the alignment tape 50, leaving a track of alignment voids 52. In operation, the laser source 62 is pulsed at such a frequency to result in generating a longitudinally arranged equally spaced apart track of alignment voids 52.

More specifically, a combination of high power and short wavelength, for example, 31 milliwatts with a wavelength of 355 nanometers, of the focused beam 70 penetrates both the first major surface and the second major surface of the alignment tape 50. A polyethylene terephthalate (PET) base film of the alignment tape 50 is transparent to UV light 68 of the laser source 62. Thus, the focused beam 70 penetrates into the first major surface and the second, opposite, major surface of the alignment tape 50, leaving only the base film of the alignment tape 50 where the focused beam 70 hits. By adjustment of the height of the drive moving the alignment tape 50 relative to the height of the laser source 62 and optics 64 and 66, the track of alignment voids 52 is positioned on the alignment tape 50 at a distance along axis 36 that can match standard optical servo tracks. This ensures that the actuator 24 is able to move the optical servo system 22 into position to see the track of alignment voids 52.

There are many ways to use the alignment tape 50 to perform alignment of a selected recording channel with the optical servo system 22 as part of the manufacturing process and prior to shipment of the fully assembled magnetic tape recording system 10 to an end-user.

In one operation, a selected recording channel is blindly aligned to the optical servo system 22 and manually set in place using the adapter 38. This initial alignment is blind since there is no practical way to visually align a selected recording channel to the optical servo system 22 with any high degree of accuracy. Only through extremely tedious methods of trial and error might the selected recorded be visually aligned to the optical servo system 22. The alignment tape 50 is placed in the magnetic tape recoding system 10. The selected recording channel writes a single linear track of data while the optics detect the track of alignment voids 52. After the single track of data is written the alignment tape 50 is removed from the magnetic tape recording system 10 and a section of the alignment tape 50 viewed under a microscope, such as exemplary microscope 75 in FIG. 5. Imaging of the section of alignment tape 50 is used in conjunction with the microscope 75. Example imaging techniques are magnetic force microscopy and optical microscopy using ferrofluids.

Figure 6A:
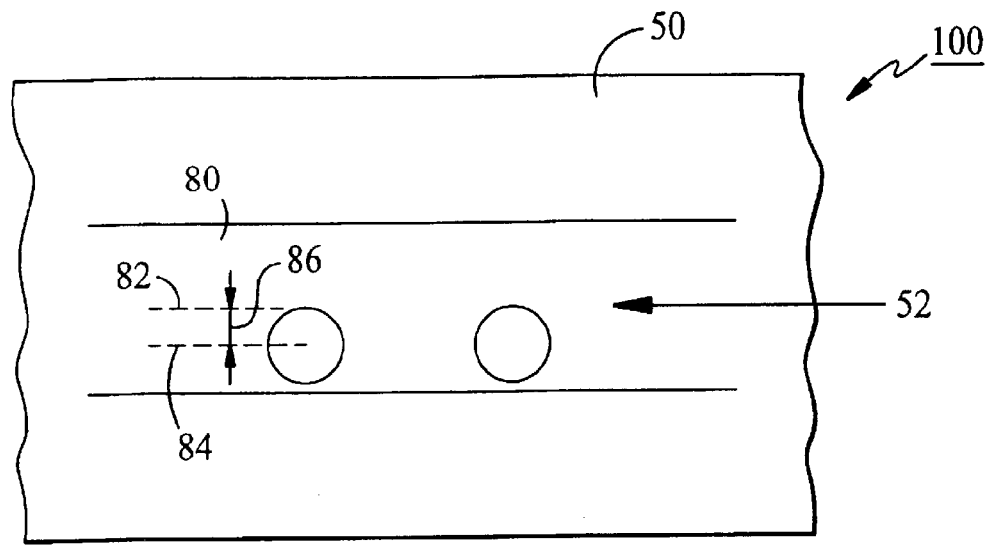
FIG. 6A is an illustration of a first exemplary image of the alignment tape under a microscope.

Referring to FIG. 6A, a first exemplary image 100 of the alignment tape 50 after the track of data has been written illustrates a single track of data 80 and the track of alignment voids 52, as viewed under the microscope 75. A center 82 of the track of data 80 is not centered relative to a center 84 of the track of alignment voids 52. A distance 86 between the center 82 of track of data 80 and the center 84 of the track of alignment voids 52 represents an actual lateral offset 86 between the selected recording channel and the optical servo system 22 measured in, for example, micrometers. Recall that before the alignment tape 50 is placed in the magnetic tape recording system 10, the selected recording channel and the optical servo system 22 are blindly aligned and positioned relative to each other by using the adjuster 38. The actual lateral offset 86 can be stored for use during system 10 operation or to finely adjust the position of the selected recording channel and the optical servo system 22 by further manual adjustment using the adjuster 38. The optical servo system 22 can be locked in place relative to the selected recording channel for further processing of the read/write assembly 14 during its manufacture.

Figure 6B:
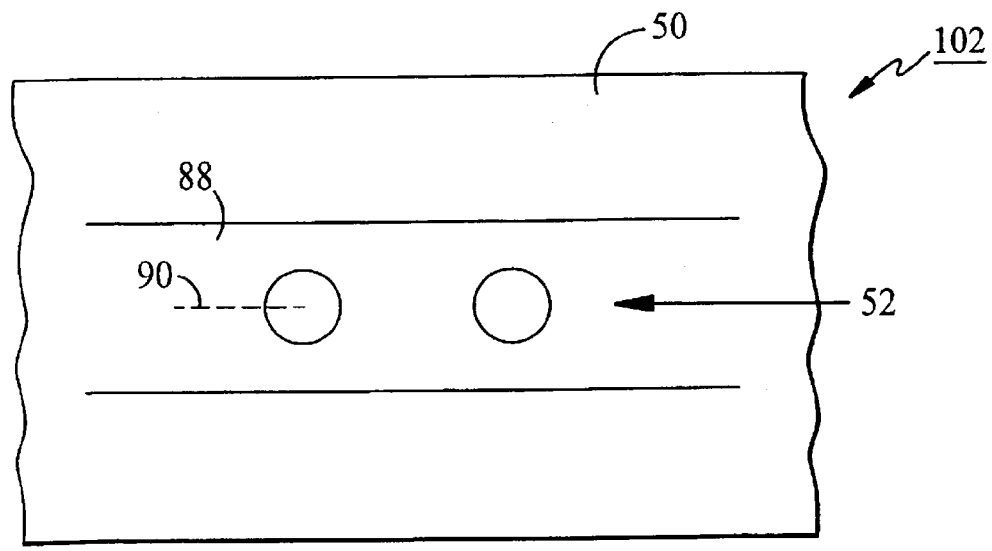
FIG. 6B is an illustration of a second exemplary image of the alignment tape under a microscope.

By way of another example, referring to FIG. 6B, a second exemplary image 102 of the alignment tape 50 after the selected recording channel has written the track of data 88 shows a single track of data 88 and the track of alignment voids 52. A center 90 of the track of alignment voids 52 is also the center of the track of data 88. Thus, the actual lateral offset is zero and may be stored for use during system 10 operation. This means that the selected recording channel and the optical servo system 22 are aligned and no further adjustment is needed. The read/write assembly 14 is ready for further processing during its manufacture.

In another example, an actual lateral offset is determined using the alignment tape 50 and a read-after-write process. Here again, initially, the selected recording channel is blindly aligned to the optical servo system 22 and manually positioned and locked using the adjuster 38. The alignment tape 50 is placed in the magnetic recording system 10. It should be noted that the optical azimuth in this example needs to be adjusted first. Vertical alignment of the optics to the magnetics may not be necessary, depending on characteristics of the magnetic recording system 10. It should also be noted that firmware more flexible than is usual in the magnetic recording system 10 would allow for even large initial misalignments to be tolerated but the optical azimuth would have to be correct for the optical servo system 22 to function properly. The selected recording channel writes a single track of data, as illustrated in FIGS. 6A and 6B, to the track of alignment voids 52. The selected recording channel includes both read and write heads such that as each datum of the track of data is written by a write head of the selected recording channel it is immediately read by a corresponding read head of the selected recording channel. This process is referred to as read-after-write and occurs during a single pass of the alignment tape 52 across the read and write heads of selected recording channel. A Bit-Error Ratio (BER) is monitored as the read head of the selected recording channel reads the track of data. The Bit-Error-Ratio represents the number of erroneous bits divided by the total number of bits transmitted, received, or processed over some stipulated period. Examples of bit error ratios are (a) transmission Bit-Error-Ratio, i.e., the number of erroneous bits received divided by the total number of bits transmitted; and (b) information Bit-Error-Ratio, i.e., the number of erroneous decoded (corrected) bits divided by the total number of decoded (corrected) bits. The BER is usually expressed as a coefficient and a power of 10. A BER of the selected recording channel that is lined up (or nearly lined up) with the optical servo system 22 greatly increases whenever data is written and read directly over the track of alignment voids 52 because data cannot be written where magnetic material on the alignment tape 50 is missing. The BER decreases when the selected recording channel is not on the track of alignment voids 52 because data can be written where the magnetic material on the alignment tape 50 is present.

Figure 7:
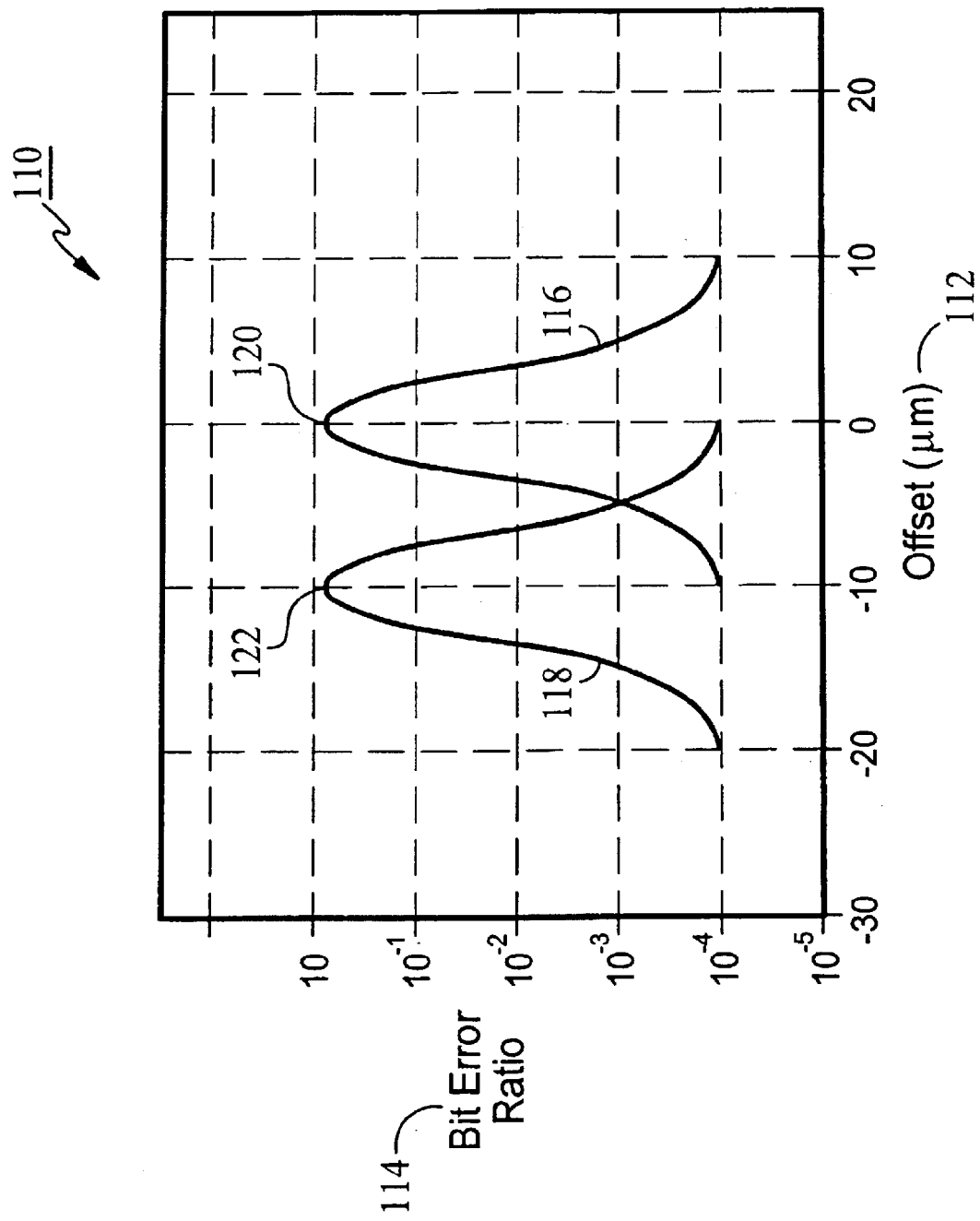
FIG. 7 is an exemplary graph of track offset verses bit-error ratio (BER).

Referring to FIG. 7, an exemplary graph 110 of the BER 114 by the selected recording channel versus track offset 112 across two tracks of the alignment tape 50 is illustrated. Here again, prior to the run, the selected recording channel is blindly aligned to the optical servo system 22 and set in place at a first position using the adjuster 38. The selected recording channel writes a single track of data to the track of alignment voids 52 as the head moves across two tracks of alignment voids. The optics 22 detects the movement across the two tracks. A first peak 116 represents a following of the BER of reads-after-writes by the selected recording channel across the first track, while a second plot 118 represents a following of the BER of reads-after-writes by the selected recording channel across the second track. The known separation of alignment void tracks allows a calibration to be made of the offset distance 112.

In the first track 116, the plot goes through a maximum BER at point 120 and correlates to a track offset of 0 by the selected recording channel. This indicates the selected recording channel is lined up directly on the track of alignment voids 52, and thus aligned properly with the optical servo system 22. For the second track by the selected recording channel, the plot 118 goes through a maximum BER at point 122. Point 122 correlates to a linear track offset of 24 $\mu$m, the separation between tracks on the alignment tape. This can be used to calibrate an offset for those cases when the peak 120 is at a non-zero offset. Thus, if in a separate and unique run of the BER 114 versus track offset 112, the peak 120 occurs at an offset of count 500 and the peak 122 occurs at an offset count of 1500, then that means that the alignment of the selected recording channel and the optical servo system 22 is off by approximately half of 24, or 12 $\mu$m and the optical servo system 22 needs to be adjusted 12 $\mu$m laterally by the adjuster 38. Correlation of the maximum BER to a positive lateral offset means the optical servo system 22 has to be moved laterally up relative to the selected recording channel, while correlation of the maximum BER to a negative lateral offset means the optical servo system 22 has to be moved laterally down relative to the selected recording channel. In each case, the adjuster 38 is used to laterally position the optical servo system 22 an amount equal to the lateral offset. Once the optical servo system 22 is adjusted relative to the selected recording channel into a second position using the determined lateral offset, and the read/write assembly 14 is ready for further processing during its manufacture.

Figure 8:
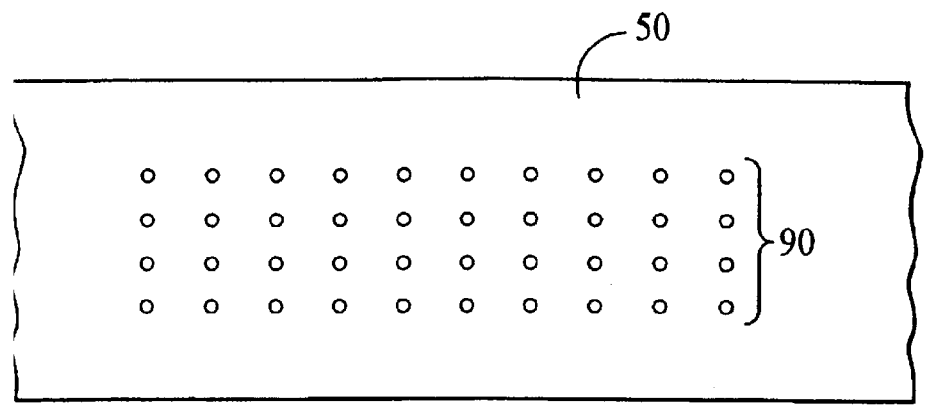
FIG. 8 is a schematic diagram of a second exemplary alignment tape.

In another example, a scanning head method is utilized in conjunction with the alignment tape 52 and the optical servo system 22 to determine an offset between the selected recording channel and the optical servo system 22. Referring to FIG. 8, the laser system 60 for producing tracks of alignment voids (of FIG. 4) is used to generate multiple parallel longitudinal tracks of alignment voids 90 on the alignment tape 50. This is accomplished by having the laser source 62 direct multiple beams of light to the servo optics system 64 and focusing the multiple beams onto the alignment tape 50 to generate the multiple tracks of alignment voids 90. The laser source 62 is pulsed at such a frequency to result in generating multiple longitudinally equal spaced apart tracks of alignment voids 90.

In operation, the selected recording channel is moved slowly across the multiple tracks of alignment voids 90 in a motion perpendicular to the alignment tape 50. During the perpendicular motion the selected recording channel writes and reads a single frequency magnetic signal on the first major surface of the alignment tape 50. The amplitude of the magnetic signal detected by the read head on the selected recording channel decreases whenever an alignment void passes across the read head, then the magnetic signal is amplitude modulated. The optical servo system 22 is turned on and an optical spot directed by a laser source in the optical servo system 22 towards and reflected off of the second, opposite, major surface of the alignment tape 50 where an optical signal is detected by an optical sensor in the optical servo system 22. The demodulated magnetic signal and the optical signal have the same frequencies, corresponding to the rate at which alignment voids, traveling with the alignment tape, move past the recording head 20 and the optical servo system 22. The selected recording channel and the optical servo system 22 are aligned when the envelope of the demodulated magnetic signal detected by the read head of the selected recording channel and the envelope of optical signal detected by the optical servo system 22 are in phase.

Figure 9:
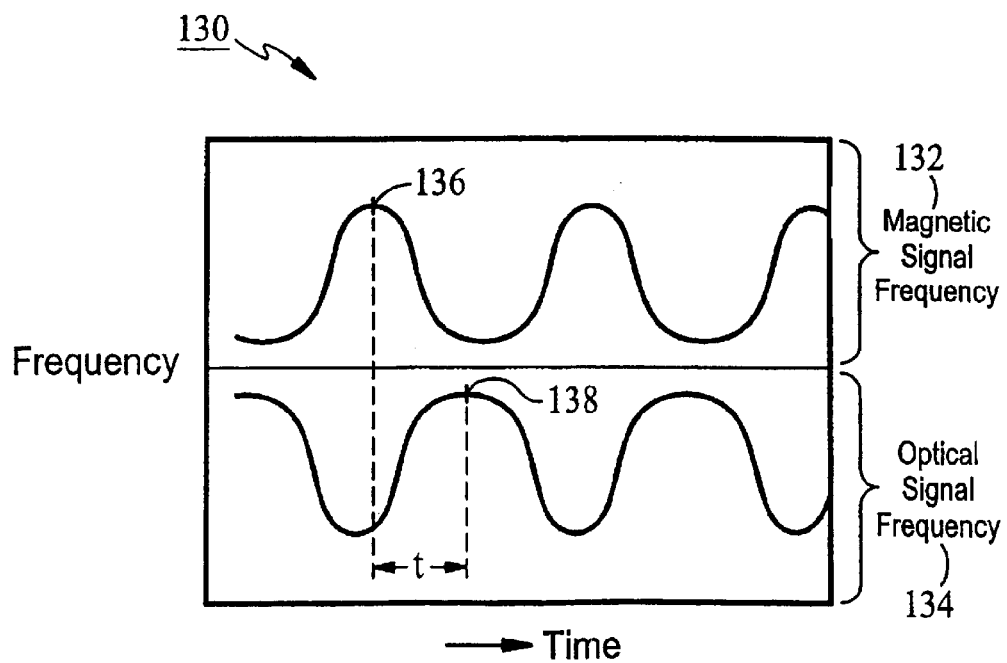
FIG. 9 is an exemplary graph of optical and magnetic signal envelopes.

Referring to FIG. 9, an exemplary graph 130 tracking the envelope of the demodulated magnetic signal 132 and the envelope of the optical signal 134 is illustrated. When the selected recording channel is centered over an alignment void in any one of the tracks of alignment voids 90 the envelope of the demodulated magnetic signal peaks at point 136, for example, since the amplitude modulation of the magnetic signal at this point is a maximum. When a spot of light generated by the optical servo system 22 is centered over an alignment void, the light reflected is a minimum, and thus the current photo detector in the optical system 22 is a minimum. However, typically an amplifier generates a voltage signal that peaks when the current is a minimum, thus when a spot of light generated by the optical servo system 22 is centered over the same alignment void in the multiple tracks of alignment voids 90 the envelope of the optical voltage signal peaks at point 138. Knowing the track pitch of the alignment voids 90, which can be controlled by adjustment of the servo writer optics 64 and can be measured by the microscope 75, one knows that each peak in the envelope of the optical signal 134 corresponds to the track pitch. Similarly, the separation of peaks of the envelope of the demodulated magnetic signal 132 also corresponds to the track pitch. The track pitch divided by the timing T between peaks gives the velocity v of the head assembly as it is scanned up and down across the alignment voids 90. Equally spaced peaks indicate a constant velocity of the head assembly. Then the timing difference t is the difference in time between peaks 136 and 138 and is converted to micrometers by multiplying by the velocity.

Figure 5:
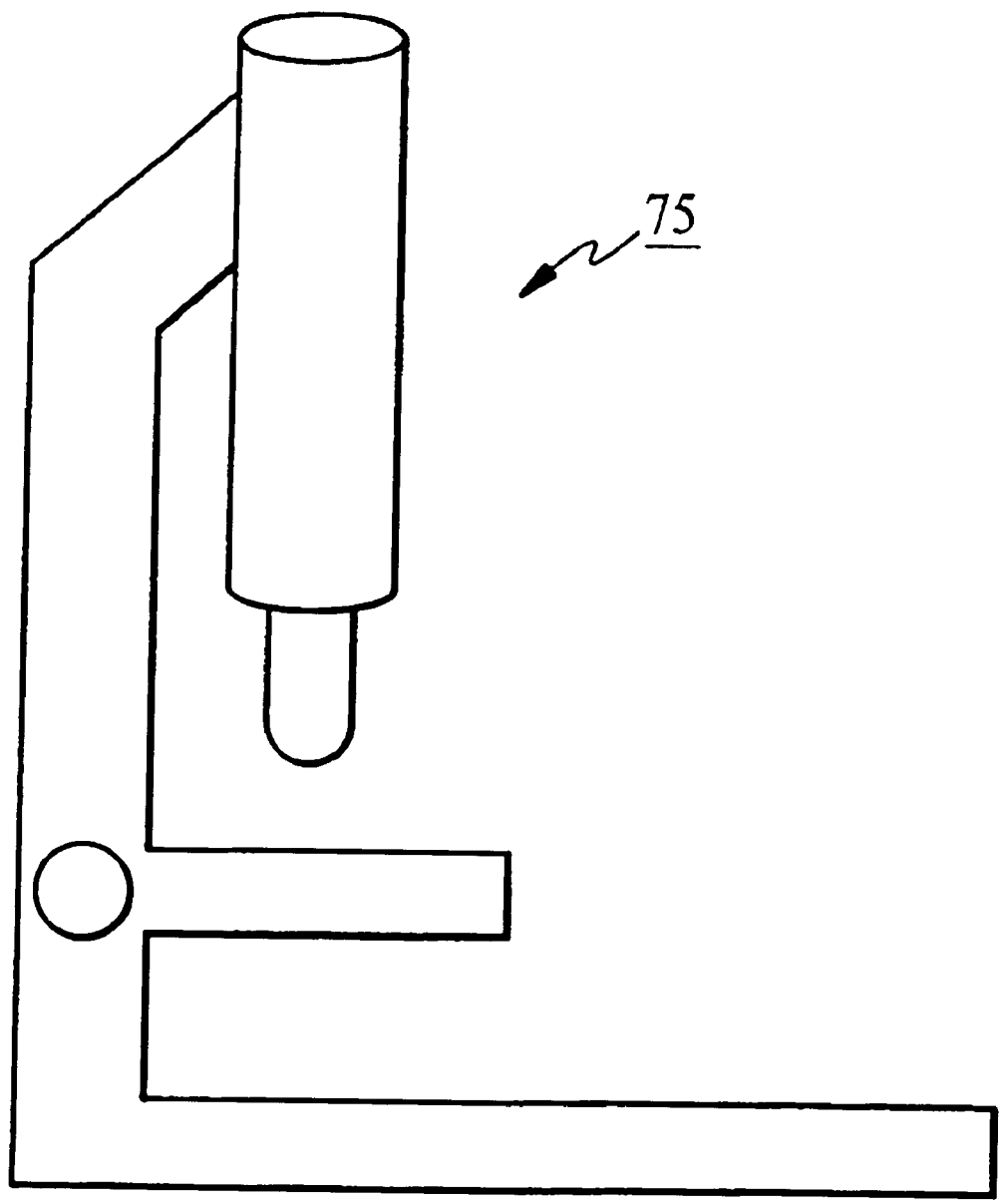
FIG. 5 is a block diagram of an exemplary microscope.
Figure 10:
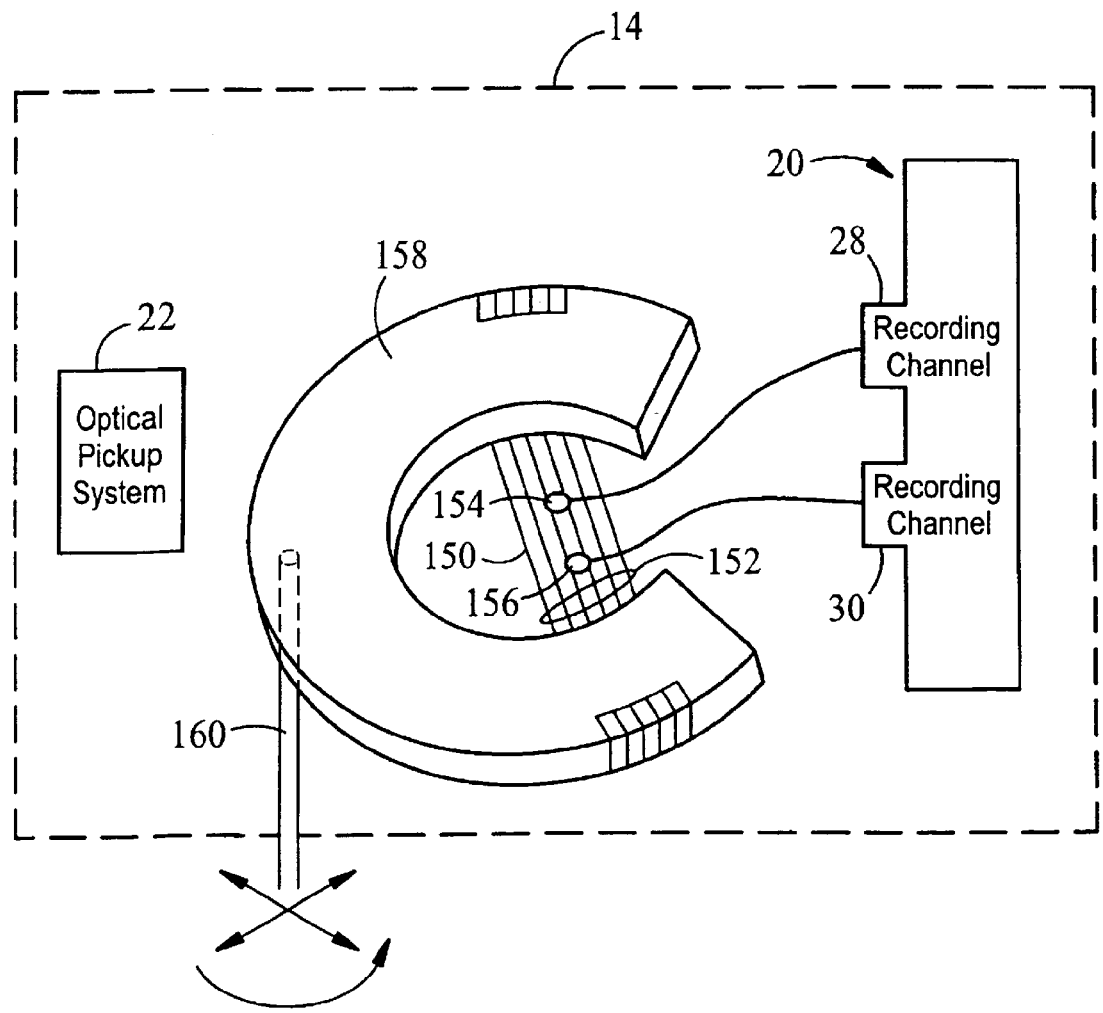
FIG. 10 is an illustration of an alignment tape used in conjunction with a positioning coupon.

In still another example, the alignment tape 150 is utilized in a static alignment process. Referring to FIG. 10, the laser system 60 is used to generate an alternate alignment tape 150 having multiple continuous longitudinal arranged tracks 152 that imprint the second major surface of the alignment tape 150 but do not expose the base film of the alignment tape. The is accomplished by having the laser source 62 direct one or more beams of light of such power, so as to partially penetrate the second major surface of the alignment tape 150 to mark the second major surface but not expose the base film and cause ejection of material from the front major surface of the alignment tape 150. In addition, two alignment windows 154 and 156 are generated by a commercial laser micro machining station. A segment of the alignment tape 150 is clamped in a metal coupon 158. The metal coupon 158 is used to hold the alignment tape 150 in place and position the alignment tape 150 within the read/write assembly 14. The alignment voids 154 and 156 are spaced apart so as to fit directly over a recording channel pair on 28 and 30 of recording head 20, e.g., 0.08 inches. The metal coupon 158 is also sized to fit between the recording channels of the recording head 20 and the optical servo system 22 and includes precision translation and rotation stages 160 to manually position the coupon 158, and consequently the alignment tape 150, accurately within the read/write assembly 14. In addition, a microscope, such as the microscope 75 of FIG. 5, is mounted to the read/write assembly 14 to aid in viewing the position of the alignment tape 150 relative to the recording channels and the optical servo system 22.

The coupon 158 positions the alignment tape 150 such that the alignment voids 154 and 156 are centered over a recording channel pair. Once oriented properly by using the precision translation stages 160 and the microscope 75, the coupon 158 is fixed in position. The optical servo system 22 is put in place and turned on and the adjuster 38 moved so that the optics 22 moves laterally up and down in a direction perpendicular to the multiple continuous longitudinal arranged tracks 152. An optical spot is produced by a laser source in the optical servo system 22 and hits the alignment tape 150. The adjuster 38 is moved by a precision translation stage 160 to position the optical spot over a center of a middle one of the multiple continuous longitudinal arranged tracks 152. Once centered, the position is fixed as a final position. The read/write assembly 14 is ready for further processing in its manufacture.

A number of embodiments of the invention have been described. Nevertheless, it will be understood that various modifications may be made without departing from the spirit and scope of the invention. Accordingly, other embodiments are within the scope of the following claims.

What is claimed is:

1. A method of positioning a selected recording channel on a recording head relative to an optical servo system in a read/write assembly comprises:

positioning the optical servo system at a first position relative to the selected recording channel in the read/write assembly:

processing an alignment tape in the read/write assembly to determine a lateral offset between the optical servo system and the selected recording channel, wherein the alignment tape includes a track of alignment voids, and processing includes writing a track of data to the alignment tape over the alignment voids; and positioning the optical servo system at a second position relative to the selected recording channel using the lateral offset.

2. The method of claim 1 wherein processing comprises:

imaging a section of the alignment tape to determine a lateral distance between a center of the track of alignment voids and a center of the track of data; and setting the lateral offset to the lateral distance.

3. The method of claim 2 wherein imaging comprises placing the section of alignment tape under a Magnetic Force microscope.

4. The method of claim 2 wherein imaging comprises placing the section of alignment tape under an optical microscope using ferrofluid.

5. The method of claim 2 wherein the lateral distance is measured in micrometers ($\mu$m).

6. The method of claim 2 wherein imaging further comprises:

determining an average lateral distance between several alignment voids and the track of data; and setting the lateral offset to the average lateral distance.

7. The method of claim 1 wherein the second position is laterally upward from the first position if the lateral offset is a negative number.

8. The method of claim 1 wherein the second position is laterally upward from the first position if the lateral offset is a positive number.

9. The method of claim 1 wherein processing comprises:

writing and subsequently reading the track of data to a front major surface of the alignment tape on the track of alignment voids with a write head and a read head of the selected recording channel;

monitoring a bit-error ratio (BER) from reading the track of data; and correlating the bit-error ratio (BER) to the lateral offset.

10. The method of claim 9 wherein correlating comprises relating a maximum BER to the lateral offset.

11. The method of claim 10 wherein a negative lateral offset value indicates the optical servo system is laterally above the selected recording channel.

12. The method of claim 10 wherein a positive lateral offset indicates the optical servo system is laterally below the selected recording channel.

13. The method of claim 9 wherein the BER represents a number of erroneous data bits read divided by the total number of data bits written.

14. A method of positioning a selected recording channel on a recording head relative to an optical servo system in a read/write assembly comprises:

positioning the optical servo system at a first position relative to the selected recording channel in the read/write assembly;

processing an alignment tape in the read/write assembly to determine a lateral offset between the optical servo system and the selected recording channel, wherein the alignment tape includes a plurality of alignment void tracks; and positioning the optical servo system at a second position relative to the selected recording channel using the lateral offset, wherein processing includes:

moving the recording head across the tracks in a motion perpendicular to a motion of the alignment tape;

writing and reading a magnetic signal to the alignment tape by the selected recording channel at a higher frequency than the frequency of alignment voids moving past the selected recording channel to determine an amplitude demodulated magnetic signal;

directing a beam of light by the optical servo system to the alignment tape to determine an optical signal; and determining a timing difference between the envelope of the demodulated magnetic signal and the envelope of the optical signal.

15. The method of claim 14 wherein determining comprises the timing difference between a peak in the envelope of the demodulated magnetic signal and a peak in the envelope of the optical signal.

16. The method of claim 15 wherein the lateral offset is set equal to the timing difference divided by the velocity.

17. The method of claim 14 wherein determining comprises calibrating the timing difference using the velocity measured from the timing difference between peaks in the envelope of the optical signal.

18. The method of claim 17 wherein the velocity is determined from the separation of peaks in the cross-correlation function.

19. The method of claim 14 wherein determining comprises the cross-correlation function to find the timing difference between the envelope of the demodulated magnetic signal and the envelope of the optical signal.

20. A method of positioning a selected recording channel on a recording head relative to an optical servo system in a read/write assembly comprises:

positioning the optical servo system at a first position relative to the selected recording channel in the read/write assembly;

processing an alignment tape in the read/write assembly to determine a lateral offset between the optical servo system and the selected recording channel, wherein the alignment tape includes a plurality of alignment void tracks; and positioning the optical servo system at a second position relative to the selected recording channel using the lateral offset, wherein processing includes:

moving the recording head across the tracks in a motion perpendicular to a motion of the alignment tape;

directing multiple beams of light by the optical servo system to the alignment tape to determine a number of optical signals; and determining a timing difference between the envelope of one optical signal and the envelope of another optical signal.

21. The method of claim 20 wherein the optics are rotated to bring the timing difference divided by the velocity to a desired value.

22. The method of claim 20 wherein determining comprises the cross-correlation function to find the timing difference between the envelope of one optical signal and the envelope of another optical signal.

23. The method of claim 1 wherein the alignment tape comprises:

a plurality of longitudinal tracks on a second major surface of the tape; and recording channel positioning alignment voids.

24. The method of claim 23 wherein the plurality of tracks are generated by passing the tape through a laser system.

25. A method of positioning a selected recording channel on a recording head relative to an optical servo system in a read/write assembly comprises:

positioning the optical servo system at a first position relative to the selected recording channel in the read/write assembly;

processing an alignment tape in the read/write assembly to determine a lateral offset between the optical servo system and the selected recording channel, wherein the alignment tape comprises:

a plurality of longitudinal tracks on a second major surface of the tape, and recording channel positioning alignment voids; and positioning the optical servo system at a second position relative to the selected recording channel using the lateral offset, wherein processing comprises:

suspending the alignment tape in a coupon;

positioning the alignment tape with the coupon over a recording channel pair to position a line from one element of a channel pair to another; and positioning the optical servo system such that one generated optical spot is centered on a middle one of the longitudinal tracks and other generated optical spots are offset by a desired amount.

26. The method of claim 25 wherein positioning comprises:

viewing the alignment tape under a microscope; and adjusting the alignment tape's position with a precision translation and rotation stage attached to the coupon.

27. An alignment tape for positioning a selected recording channel of a recording head relative to an optical servo system in a read/write assembly comprises:

an elongated continuous web of flexible plastic substrate material having two edges and defining a front major surface and a back major surface;

a magnetic storage medium formed on the front major surface;

an inert medium formed on the back major surface; and a track of alignment voids for indicating actual lateral displacement of the selected recording channel relative to the optical servo system, wherein the track of alignment voids is formed by ablation by a pulsating laser beam of sufficient power to penetrate the back major surface through to the front major surface leaving visible the flexible plastic substrate of the alignment tape.

28. A method of positioning a selected recording channel on a recording head relative to an optical servo system comprises:

fixedly positioning the optical servo system at a position relative to the selected recording channel;

processing an alignment tape to determine a lateral offset between the optical servo system and the selected recording channel; and storing the lateral offset.

29. The method of claim 28 further comprising aligning a data track with the selected recording channel using the optical servo system and the stored lateral offset during tape travel across the selected recording channel.

* * * * *